US007699117B2

(12) United States Patent
Johnston et al.

(10) Patent No.: US 7,699,117 B2
(45) Date of Patent: Apr. 20, 2010

(54) FIRE PROTECTION SPRINKLER SYSTEM AND RELATED APPARATUS

(75) Inventors: Wayne R. Johnston, San Marcos, CA (US); Alan G. Johnston, Nashua, NH (US)

(73) Assignee: The Wanda Group, Nashua, NH (US)

( * ) Notice: Subject to any disclaimer, the term of this patent is extended or adjusted under 35 U.S.C. 154(b) by 319 days.

(21) Appl. No.: 11/746,564

(22) Filed: May 9, 2007

(65) Prior Publication Data

US 2008/0277124 A1 Nov. 13, 2008

(51) Int. Cl.

| | |
|---|---|
| ***A62C 35/00*** | (2006.01) |
| ***A62C 2/00*** | (2006.01) |
| ***A62C 3/00*** | (2006.01) |
| ***B05B 15/06*** | (2006.01) |
| ***F16L 3/00*** | (2006.01) |
| ***E04C 2/52*** | (2006.01) |

(52) U.S. Cl. ............................ 169/43; 169/16; 169/46; 169/51; 239/208; 239/209; 248/62; 52/220.1

(58) Field of Classification Search .................. 169/16, 169/43, 46, 51; 239/208, 209, 276, 282, 239/283; 248/62; 52/220.1, 220.6, 287.1, 52/288.1

See application file for complete search history.

(56) References Cited

U.S. PATENT DOCUMENTS 1,681,470 A * 8/1928 Drees .......................... 285/64
4,079,786 A 3/1978 Moling
4,133,387 A * 1/1979 Tervidis ....................... 169/51
4,746,066 A * 5/1988 Kitchens ..................... 239/283
4,834,186 A * 5/1989 Ballard ........................ 169/16
4,901,957 A 2/1990 Daigle et al.
5,327,976 A * 7/1994 Hattori ........................ 169/43
6,540,261 B1 * 4/2003 Painter et al. .......... 285/133.11
6,691,790 B1 * 2/2004 MacDonald et al. .......... 169/16
6,752,218 B2 6/2004 MacDonald, III et al.
6,907,938 B2 6/2005 MacDonald, III et al.
7,426,784 B2 * 9/2008 Spears et al. ............. 29/890.14

OTHER PUBLICATIONS

Bushee, "Towns hot for home sprinklers, fire safety", The Telegraph, Nashua, New Hampshire, pp. 1 and 7 (Dec. 5, 2005).

* cited by examiner

*Primary Examiner*—Dinh Q Nguyen
*Assistant Examiner*—Ryan Reis
(74) *Attorney, Agent, or Firm*—The Maxham Firm

(57) ABSTRACT

A nondestructive retrofit fire sprinkler protection system including a sprinkler fitting with a unique shape that inserts behind a wall surface and that securely connects a sprinkler head emerging from a wall location to preferably concealed sprinkler piping located in a room at a point where the ceiling surface meets a wall surfaces. In addition, a room coupler fitting is adapted to be inserted between wall structures to connect sprinkler piping in adjacent rooms.

10 Claims, 6 Drawing Sheets

FIRE PROTECTION SPRINKLER SYSTEM AND RELATED APPARATUS

BACKGROUND

1. Field of Invention

The present invention relates generally to fire protection sprinkler systems, and more particularly to a connector between pipes and from a pipe to a sprinkler head, that may be installed with walls already in place.

2. Background of the Invention

It is well known that fire protection sprinkler systems save lives and property. Such sprinkler systems typically operate by detecting a fire at a specified location within a structure and then by activating a controlled flow of fire retardant from a sprinkler head that controls or extinguishes the blaze at the specific location. Fire protection sprinkler systems give people more time to exit a structure and they often control or eliminate blazes before fire fighters can be dispatched.

While these benefits have been widely recognized and capitalized on in commercial office structures, sprinkler systems are less frequently employed in residential construction. Fortunately, this trend is beginning to change and fire protection sprinkler systems are being used or required with greater frequency in residential construction. The most beneficial safety measure is a combination of smoke alarms and fire sprinklers, which some have estimated to reduce the risk of death in home fires by as much as 82% (www.homefiresprinkler.org), while only adding to the cost of new construction homes by 1 to 1.5%.

Recognizing these benefits and the consequent reduction of burdens on emergency personnel, many government authorities have adopted codes and ordinances requiring fire protection sprinkler system installation, particularly in buildings and homes of new construction. Some authorities have also required installation of sprinkler systems when a building or home is remodeled or redesigned.

Generally speaking, it is easier and less expensive to outfit a building of new construction than it is to retrofit an existing structure with the safety devices. This is because with new construction, the installation of frame, drywall, ceilings, detectors, plumbing, and the like may be time-coordinated to permit ideal placement of the system within the building infrastructure. Blueprints can be drafted and construction coordinated with sprinkler systems in mind. However, this theoretical new construction advantage can easily become a detriment if schedules of various contractors are not precisely maintained and met. Again, in general with existing structures, retrofitting can be an extremely expensive process if walls and ceilings must be ripped out, plumbing reconfigured, and building obstructions negotiated to allow for sprinkler piping. Then there is costly and time consuming repair work to repair walls and ceilings to bring them back to their original condition. Skilled craftsmen must be scheduled and employed to perform these tasks. Other barriers to retrofitting as previously accomplished include cramped working conditions, poor lighting, and poor ventilation, among others. In a multistory dwelling, access to lower floor ceilings is normally completely blocked by the floor above.

Some progress has been made in the field of retrofitting sprinkler systems, but much improvement is needed in the field. For instance, U.S. Pat. No. 4,746,066 to Kitchens discloses support brackets and a rather large covering for concealing and holding retrofitted sprinkler piping to a wall. U.S. Pat. No. 6,691,790 to MacDonald discloses a sprinkler system employing flexible tubing that is useful in retrofitting.

While these improvements may be useful, they do not address the concerns of the present invention in the field of sprinkler systems. Specifically, there is a need for concealable retrofit sprinkler systems and attachment apparatus that connect sprinkler piping from room-to-room where wall widths differ. There is a further need for attachment apparatus to connect concealed sprinkler pipes to sprinkler heads at locations away from ceiling fans and lights, for instance, at wall-mounted positions.

SUMMARY OF THE INVENTION

Accordingly, it is a purpose of the present invention to provide a sprinkler system that satisfies the deficiencies pointed out above. Embodiments of the invention include a sprinkler fitting that is easy to install with no visible damage to walls and ceilings, and that offers easy and secure concealable connections between sprinkler piping and sprinkler head outlet(s) on adjacent wall surfaces. While the apparatus of the invention is particularly adapted for retrofitting already completed rooms, it can be as well employed in new construction.

Embodiments of the invention provide a room coupler fitting that connects sprinkler piping separated by walls or piping located in separate rooms, facilitates multiple connections between rooms, and facilitates rapid adjustment for connections between piping separated by varying wall widths.

The present invention provides a system of sprinkler fittings that facilitate rapid retrofitting of an existing building previously without fire protection sprinklers, with minimal resulting damage to the building being retrofitted.

According to embodiments of the invention, components are provided for use with a sprinkler system that are easy to connect to concealed retrofit sprinkler piping and that reduce the overall costs of retrofitting buildings with sprinkler systems. Concealment may be provided by decorative room structures, such as crown molding.

Installation of a sprinkler system according to the present invention is accomplished without the need for extensive wall repairs.

BRIEF DESCRIPTION OF THE DRAWING

The manner in which these objectives and other desirable characteristics can be obtained is explained in the following detailed description and attached drawing figures, in which.

DETAILED DESCRIPTION OF THE PREFERRED EMBODIMENTS

It is to be noted that the appended drawing illustrates only typical embodiments of this invention and are therefore not to be considered limiting of its scope, for the invention may admit to other equally effective embodiments.

FIGS. 1-4 depict different views of a preferred sprinkler fitting 1 of the present invention. Sprinkler fitting 1 serves a primary function of securely connecting sprinkler head 6, represented schematically in FIG. 4, to sprinkler piping 11, thus placing the sprinkler head in fluid connection with a source of fire retardant fluid, which is typically water. A sprinkler head may be located on a wall surface, for instance, to avoid ornamental ceilings, fans, or impediments to ceiling placement. This is particularly the case in retrofitting jobs where sprinklers are being installed in pre-existing building structures, and where such structures have barriers such as wall top plates 23 (FIG. 6) that may obstruct access to the ceiling and placement of a sprinkler head without undue damage to existing structures. Lower floors of a multistory residential building also make ceiling access difficult for retrofitting sprinkler systems, as stated above in the Background. Sprinkler fitting 1 is useful in accomplishing this sprinkler head placement at a position along a wall.

Figure 4:
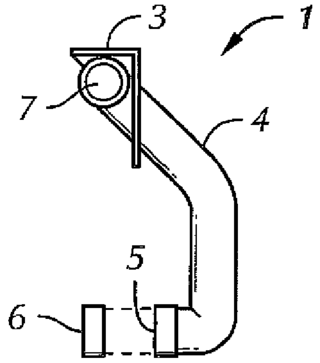
FIG. 4 is a side view of the sprinkler fitting depicted in FIGS. 1-3, showing a preferable bend in the main conduit leading to a sprinkler head outlet.
Figure 5:
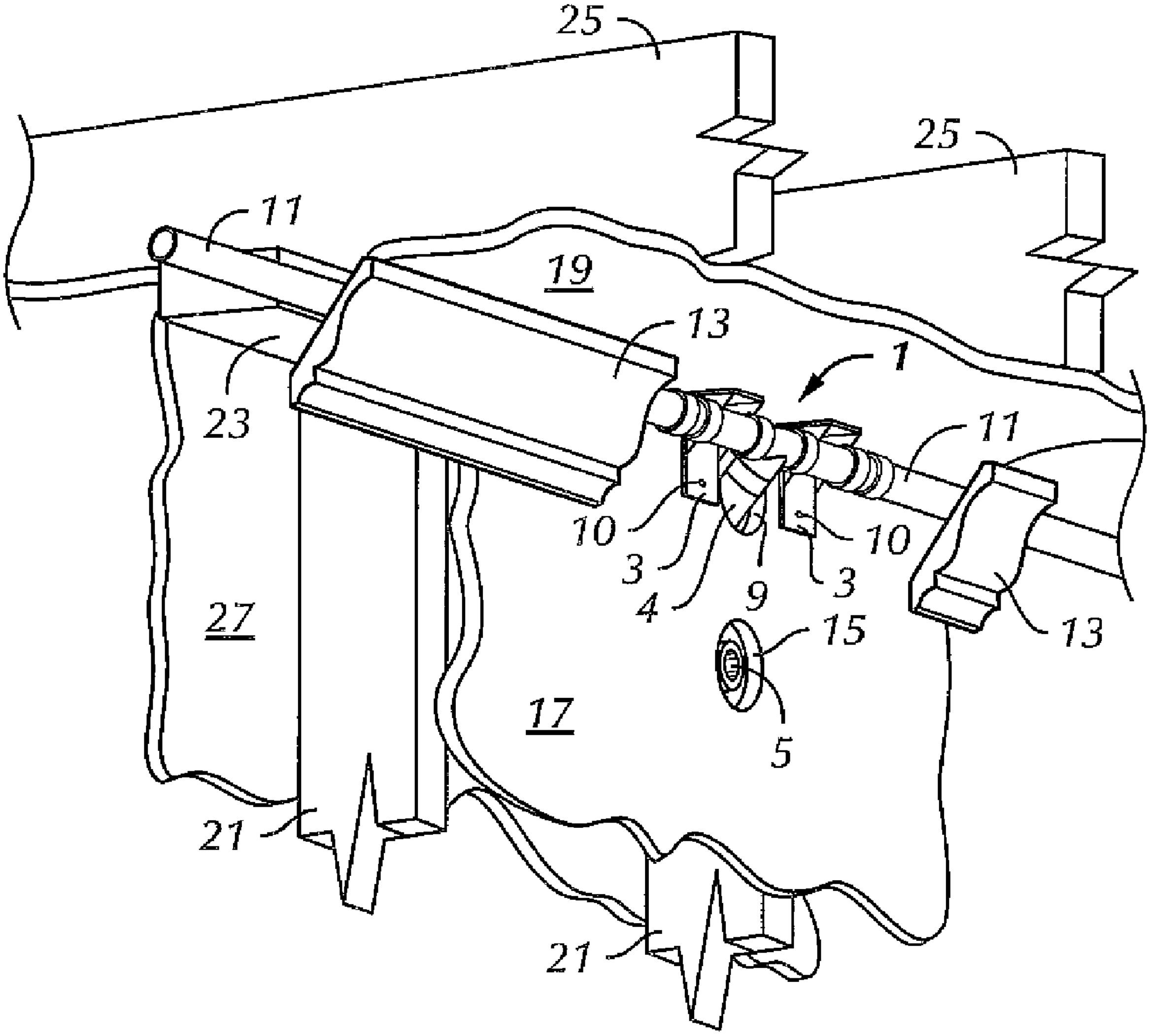
FIG. 5 is a perspective, partially cut-away view of the sprinkler fitting depicted in FIGS. 1-4 as it appears when connected in the wall structure of a building.
Figure 6:
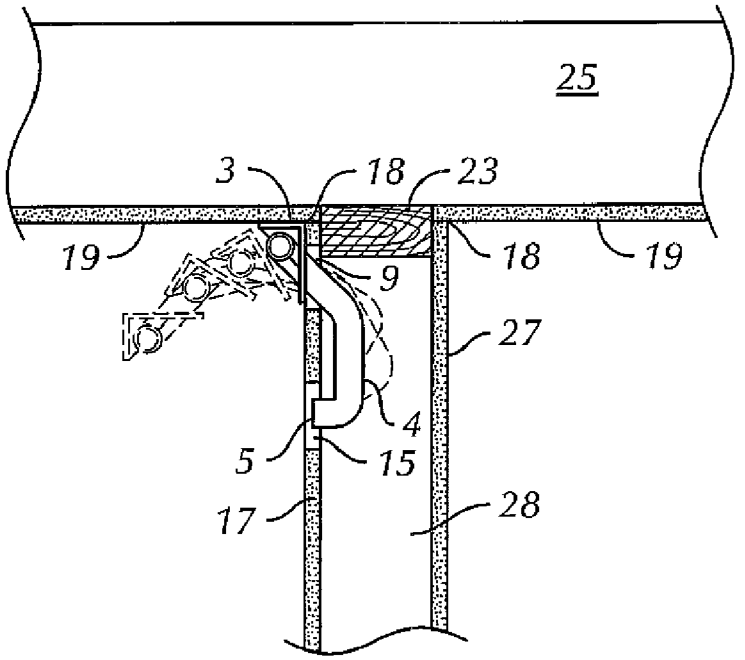
FIG. 6 is a cross-sectional, dynamic side view of the sprinkler fitting depicted in FIGS. 1-5, further demonstrating a preferable installation path for the fitting as it is inserted and then fixed within a wall structure.

As shown in FIGS. 1-4, the proximal end of sprinkler fitting 1 preferably has a T-shape where top portion 8 of the fitting intersects main conduit 4 and wherein the main conduit culminates with a sprinkler head outlet or coupling 5 at the distal end. As shown best in FIG. 4, main conduit 4 features a preferable “dog leg” or “J” shape when including sprinkler head outlet 5. As shown in FIGS. 5 and 6 (discussed further herein), this shape is particularly beneficial for purposes of inserting the main conduit portion of the fitting into a wall with no visible damage, while simultaneously providing a secure location for fixing wall-mounted sprinkler head 6 to an ultimate source of water.

Figure 1:
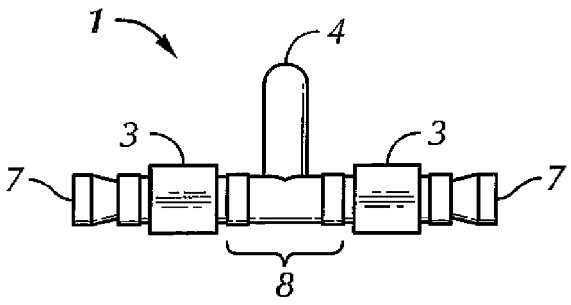
FIG. 1 is a top view of a sprinkler fitting of the present invention used to connect concealed sprinkler piping to a sprinkler head on an adjacent wall.
Figure 2:
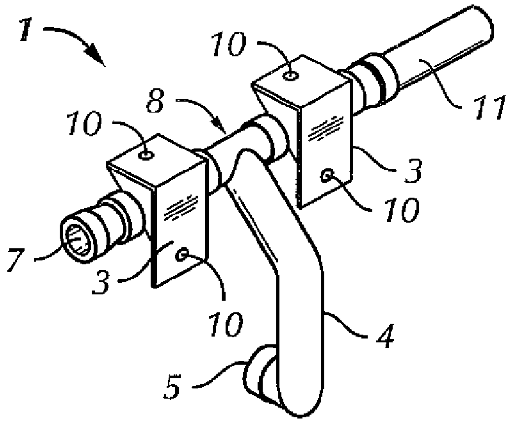
FIG. 2 is an isometric view of the sprinkler fitting depicted in FIG. 1, showing piping connectors, wall connectors, a main conduit, and an outlet for a sprinkler head.
Figure 3:
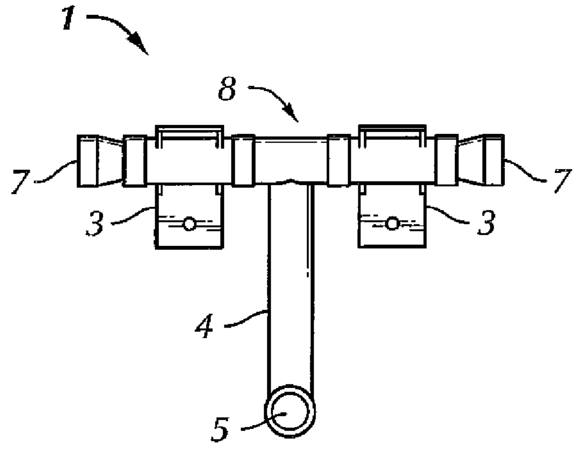
FIG. 3 is a front view of the sprinkler fitting depicted in FIGS. 1 and 2.

Sprinkler fitting 1 further features pipe connectors 7 at opposite ends of top portion 8, which pipe connectors place the sprinkler fitting in fluid connection with sprinkler piping 11 (FIG. 2). Sprinkler fitting 1 further features at least one wall bracket or connector 3 to secure the sprinkler fitting to wall or ceiling surfaces, or both. As shown in FIGS. 2 and 4, these wall connectors preferably feature perpendicular surfaces that are adapted to connect to respective ceiling and wall surfaces where they intersect. Wall connector 3 may be a bracket with surfaces oriented in perpendicular fashion so that those surfaces may meet and fix to both a ceiling and an adjacent wall surface. Wall connectors 3 preferably feature fastening means 10, which include, but are not limited to holes for screws, nails, bolts, or similarly functioning apparatus that fixedly secure the wall connectors in place.

FIG. 5 is a perspective view of sprinkler fitting 1 depicted as it appears when connected in the wall structure of a building, further including a cut-away view of how the sprinkler fitting connects to sprinkler piping 11, and how main conduit 4 of the fitting is primarily concealed behind wall surface 17. This view also shows how the sprinkler fitting is adapted to work in conjunction with a system of sprinkler piping 11 concealed behind crown molding 13, or similar aesthetic concealing element. This type of concealed sprinkler system is particularly useful where fire protection sprinklers are being installed in a pre-existing residence or other building.

As shown in FIG. 5, sprinkler fitting 1 is securely fixed by wall connectors 3 at a point near where front wall surface 17 meets ceiling surface 19. Main conduit 4 of the sprinkler fitting is inserted through wall 17 at an upper aperture 9 in the wall. Sprinkler outlet 5, which forms the lower portion of main conduit 4, then intersects wall 17, again at a lower aperture 15 in the wall, which is where an attachment is made between sprinkler head 6 and sprinkler outlet 5 by a conventional fastening means that allows for fluid connection. Such fastening means may be accomplished from a variety of devices, including but not limited to, clamps, screw-in threadable apparatus, snap-on connections, or other configurations known in the industry. While fitting 1 is shown connected between two lengths of pipe 11, it is possible for the fitting to be at the end of a length of pipe and have a single connection, the opposite end of top portion 8 being closed off or capped.

FIG. 6 is a cross-sectional side view of sprinkler fitting 1, further demonstrating a preferable installation path (broken lines) for the sprinkler fitting as it is inserted and then fixed between front wall panel 17 and rear wall panel 27. This drawing shows a wall top plate 23, which is typically fixed between front and rear wall panels at a point near where walls meet ceiling surfaces 19. This figure is also useful in demonstrating how the preferable shape of main conduit 4, as the “J” or “dog-leg” shape, permits ready insertion and securing of a sprinkler head to an ultimate water source flowing through piping 11 and sprinkler fitting 1, as seen in FIG. 5. The steps in the method of installation are set out below.

While fitting 1 normally connects between two segments of piping 11, there may be instances where the fitting will be at the end of a run of piping. This would mean that there is no need for both connectors 7 to be coupled to a piping segment so one of connectors 7 can be capped off or plugged in some conventional manner.

Sprinkler fitting 1 and the components described herein are preferably constructed from materials selected from, but not limited to, PVC, CPVC, polypropylene, polyethylene, alloys, cross linked polyethylenes (often referred to by the acronym, PEX), plastics, and other molded, cast, or extruded materials, and metals such as brass or copper, among others. The sprinkler fitting and its constituent parts may be of uniform fabrication or they may be modular. Sprinkler fitting 1 is adapted to connect with sprinkler piping 11, which typically ranges from about 0.5 to 1.0 inch in diameter. Consequently, each of main conduit 4, top portion 8, and sprinkler outlet 5 are preferably in the range of from about 0.375 to 0.75 inch in diameter. A preferable diameter of such components is about 0.75 inch, as this diameter best serves purposes of concealing the retrofit fire sprinkler components behind molding 13.

A method of installing sprinkler fitting 1 is graphically shown in FIG. 6. The preferable steps as shown include forming (preferably by cutting or punching) a top aperture 9 in wall 17 and forming lower aperture 15 directly below aperture 9 in the wall. The sprinkler fitting is inserted through top aperture 9, distal end first, so that outlet 5, which defines the lower or distal portion of main conduit 4 of the sprinkler fitting, enters into internal wall space 28. Sprinkler head outlet 5 is aligned with lower aperture 15 in wall 17 and fitting 1 is rotated into open space 28 until top portion 8 of the sprinkler fitting resides at wall/ceiling joint 18. Connector 3 then fits against the wall and the ceiling and is secured by fastening means 10 (FIG. 5). Sprinkler head 6 (FIG. 4) is then securely connected to sprinkler head outlet 5 by a conventional fastening or a coupling means, and fitting 1 is coupled to piping 11. Note that connectors 3 could be employed at spaced locations to connect piping 11 to the wall/ceiling junction.

There may be instances where, for some reason, aperture 15 is not directly below aperture 9. In such case, the T-shape of fitting 1 would be skewed so that it will align properly with piping 11 and with offset aperture 15.

Figure 7:
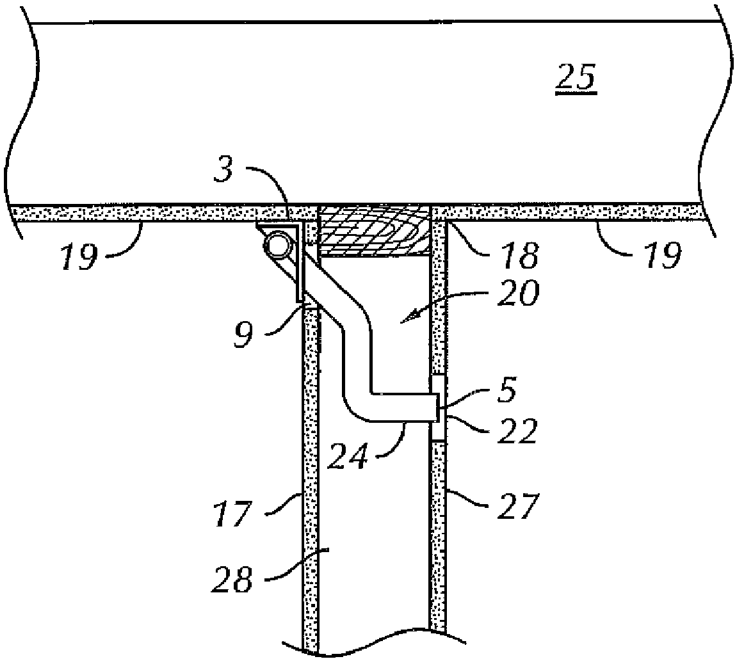
FIG. 7 is an alternative embodiment of the sprinkler fitting of FIGS. 1-6, showing connection through a wall where the supply piping is on the opposite side of the wall.
Figure 8:
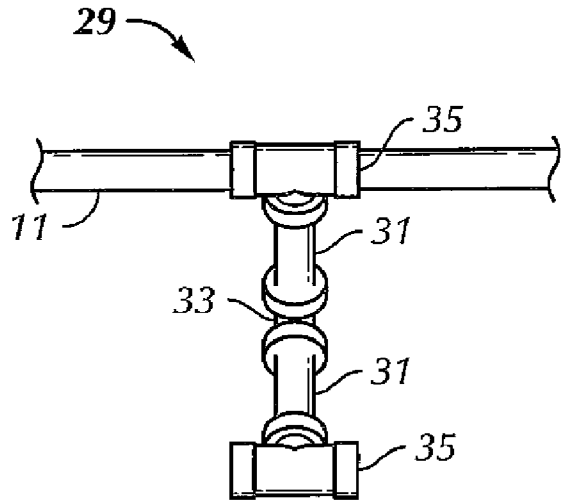
FIG. 8 is a top view of a preferred alternative embodiment for a sprinkler fitting that links sprinkler piping between different rooms.
Figure 9:
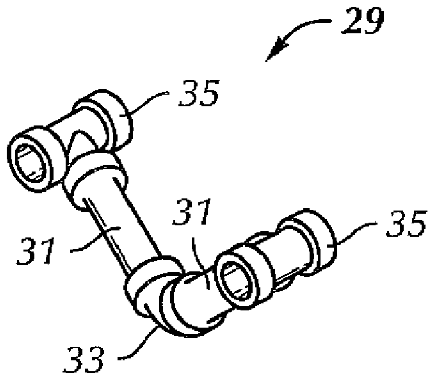
FIG. 9 is an isometric view of the sprinkler fitting of FIG. 8.
Figure 10:
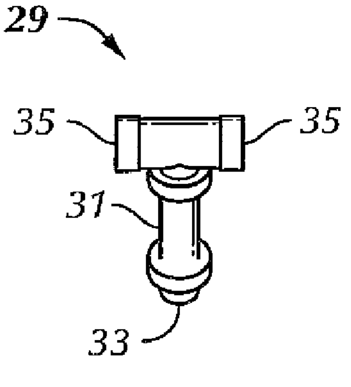
FIG. 10 is a front view of the room coupler fitting of FIGS. 8 and 9.

An alternative embodiment is shown in FIG. 7. The room on the side of wall 27 is small, such as a bathroom or closet, for example, and only a single sprinkler head is needed. Rather than having piping installed along a wall/ceiling junction for a single sprinkler head, sprinkler fitting 20 is formed as an opposite direction "dog-leg" or "L" shape. In this case, distal end 24 of fitting 20 is inserted into aperture 22 in wall 27. Outlet 5, as before, is configured to couple to a sprinkler head. All other structures in FIG. 7 are the same as in FIG. 6.

FIGS. 8-11 depict multiple views of another embodiment of the present invention, namely, room connector 29 that is particularly useful in retrofitting pre-existing building structures with fire sprinkler systems. The room connector is useful in connecting sprinkler piping 11 between adjacent rooms of a building, typically separated by wall structures. Connector 29 extends between walls and serves to interconnect sprinkler piping located in rooms having a common wall. Connector 29 features coupler piping connectors 35 located at opposite ends of the connector. If desired, more than one such connector may interconnect parallel pipes on opposite sides of a wall.

Connectors 35 are adapted to fixedly connect and place in fluid communication segments of sprinkler piping 11 located in separate but adjacent rooms. The width between walls frequently varies, so room connector 29 benefits from a unique shape and construction particularly suited for the task. As best viewed in FIGS. 9 and 11, each room coupler fitting has a middle conduit portion and fitting 33, preferably of a "V" or "elbow" shape, that serves to join side conduit sections 31 that extend from and connect middle fitting 33 to coupler piping connectors 35. Side sections 31 have a first end that connects to fitting 33 and second end by which secure connection is made to pipe connector 35. The two side sections 31, fitting 33, and coupler piping connectors 35 are in fluid communication with one another. These elements are preferably constructed from materials selected from, but not limited to, PVC, CPVC, polypropylene, polyethylene, PEX, alloys, plastics, and other molded, cast, or extruded materials, and metals such as brass or copper, among others. Room connector 29 and its constituent parts may be of uniform fabrication or they may be modular. Additionally, it is preferable that side sections 31, and possibly middle fitting 33, be flexible, which feature may be accomplished by means including, but not limited to, use of corrugated or other flexible plastic, flexible rubber, or synthetic rubber. Flexibility of side conduits sections 31 facilitates accommodating varying widths and shapes between walls.

Figure 12:
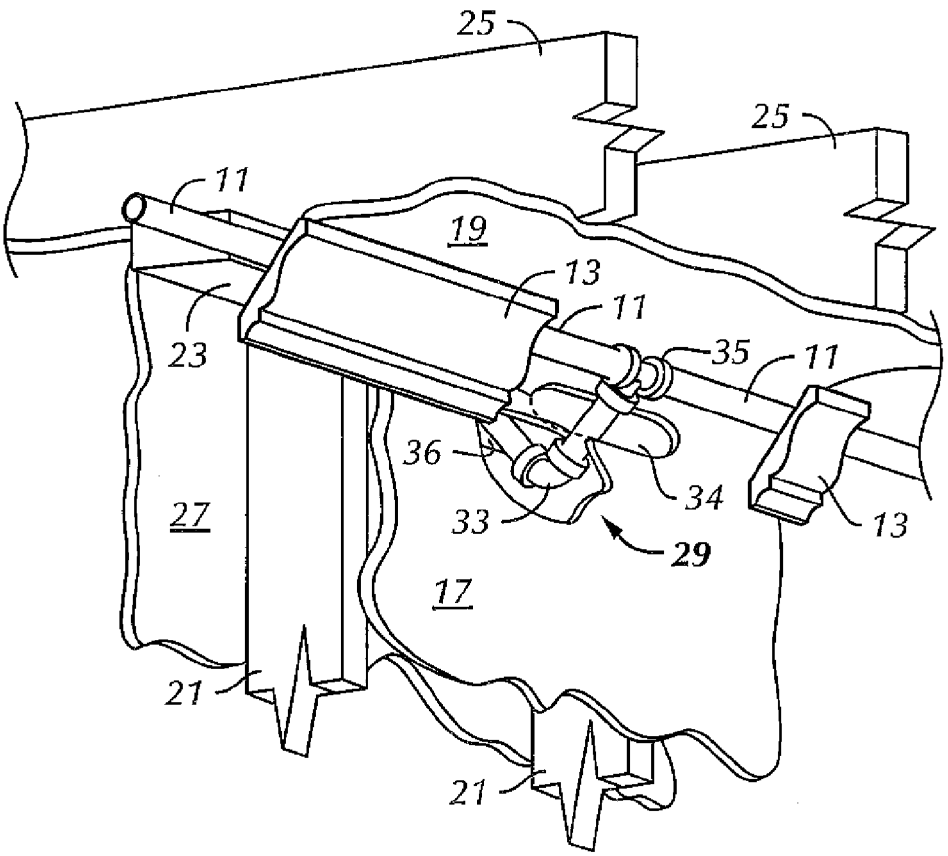
FIG. 12 is a perspective, partially cut-away view of the room coupler fitting in FIGS. 8-11 as the coupler fitting preferably functions when connecting sprinkler piping in separate rooms through a common wall.

FIG. 12 is a perspective, cut-away view of room connector 29 as it is typically used in coupling sprinkler piping 11 in back-to-back rooms. This connector is particularly useful in conjunction with retrofit fire prevention sprinkler systems that operate by concealing sprinkler piping 11 behind aesthetic devices, such as crown molding 13, at the junction where ceiling surface 19 and front wall surface 17 intersect. The connector is shown where it typically is situated between front wall 17 and rear wall 27. Connector 29 inserts at upper apertures 34, 36, which occur at opposite front and rear wall surfaces. These upper apertures are preferably horizontally elongated to permit manipulation of fitting 29 as it is installed, and is located at the upper portion of these wall surfaces adjacent ceiling surfaces 19, so that elongated apertures 34, 36 may be concealed by a molding 13, as shown in FIG. 12.

Figure 11:
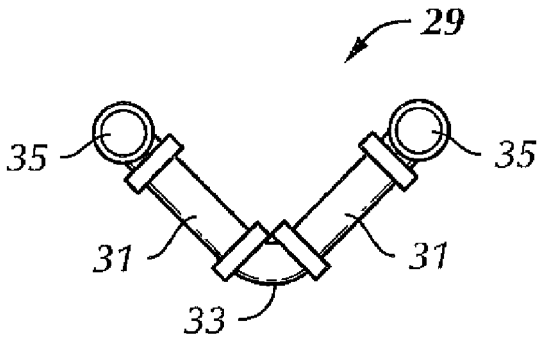
FIG. 11 is a side view of the room coupler fitting of FIGS. 8-10 depicting a preferable end fitting for the room coupler fitting.

Middle fitting 33 preferably defines a 90-degree angle, as shown in FIG. 11, thus forming a "V" shape for room connector 29. However, angles in the range of about zero to about 90 degrees may also be formed as the connector is adapted to adjust and preferably has shape-retaining rigidity while still being appropriately flexible. Middle fitting 33 may also be formed from flexible materials, similar to side sections 31.

Figure 13:
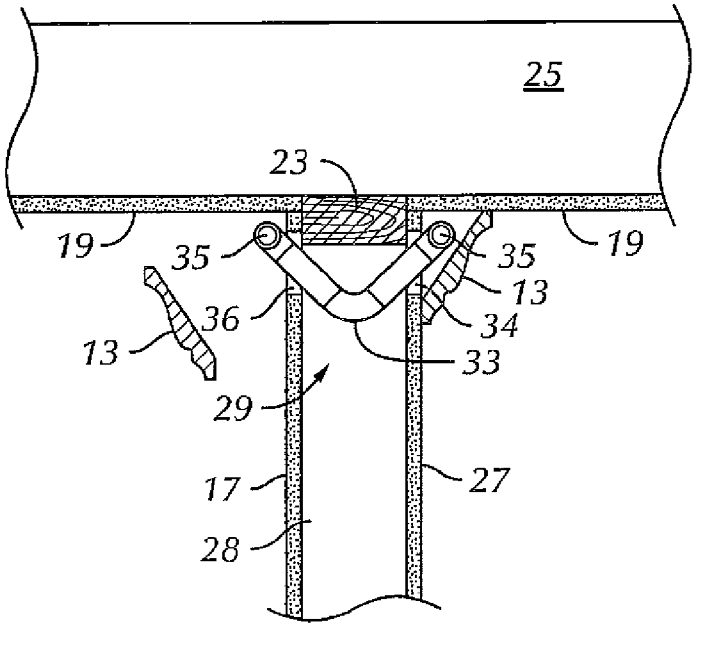
FIG. 13 is a cross-sectional side view of the room coupler fitting of FIGS. 8-12.

FIG. 13 is a cross-sectional side view of room connector 29 as fixed between front wall 17 and rear wall 27, through upper apertures 34, 36 and beneath common wall top plate 23. This figure also is useful in viewing how molding 13 is used to conceal room connector 29 and the point of insertion (apertures) in wall surfaces, as well as piping 11. It also shows that the V-shape facilitates connections to adjacent pipes while avoiding top plate 23. The room connector is adapted to connect with sprinkler piping 11, which typically ranges from about 0.5 to 1.0 inch in diameter. Consequently, each of side sections 31, middle fitting 33, and the piping of connector 29 are preferably in the range of from about 0.5 to 1.0 inch in diameter. A preferable diameter of such components is about 0.75 inch, as this diameter best serves the purposes of concealing the retrofit fire protection sprinkler components behind molding 13.

The method for placement of connector 29 is similar, to some degree, to that employed for fitting 1 of FIGS. 1-6. One end 35 is inserted through opening 36, for example, with middle fitting 33 oriented laterally, upwardly, or downwardly. Apertures 34, 36 are large enough to permit some maneuvering of fitting 29. Inserted end 35 is then pushed through to aperture 34 in wall 27 and when an end 35 projects out of each of apertures 34, 36, connector 29 is rotated to the orientation shown in FIG. 13. End fittings 35 are then coupled to piping 11, as before.

Figure 14:
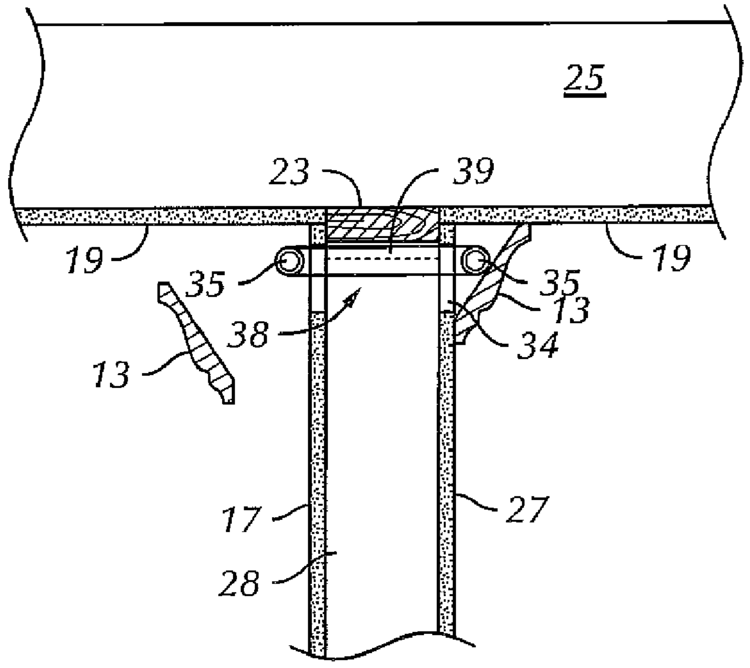
FIG. 14 is a cross-sectional view similar to FIG. 13 with an alternative, straight-through fitting.

An alternative of the room connector is shown in FIG. 14. In this configuration, connector 38 is formed with straight conduit 39 between piping connectors 35. In order to accommodate this straight room connector, wall top plate 23 must have a groove cut in it as shown.

Figure 15:
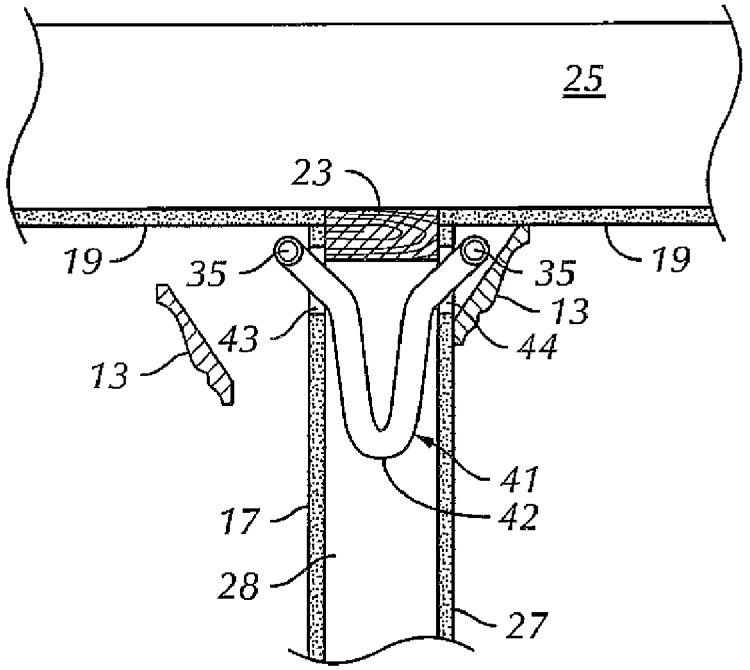
FIG. 15 is a cross sectional view of yet another alternative fitting embodiment in accordance with the invention.

Another room connector embodiment is shown in FIG. 15. In this configuration, connector 41 has a longer and more flexible conduit 42 interconnecting piping connectors 35. Conduit 42 is still sufficiently rigid to enable connector 41 to be inserted through one opening 43 in wall 17 and out through opening 44 in wall 27, but it is more flexible than the embodiments of FIGS. 8-14 to accommodate wall thickness variation or adjacent ceiling height differences. Alternatively, flexible conduit 42 could even be a coil, rather than a loop, for even greater flexibility.

It is to be noted, however, that the appended drawings illustrate only typical embodiments of this invention and are therefore not to be considered limiting of its scope, for the invention may admit to other equally effective embodiments which are appreciated by those skillful in the arts. The invention is to be construed in accordance with the claims and reasonable equivalents thereto.

What is claimed is:

1. A fire protection apparatus for installation in a space having at least one wall and a ceiling in adjacent relationship therewith forming a wall/ceiling junction, the wall having a first side and a second side spaced from the first side and defining an internal space therebetween, and having a first hole adjacent the wall/ceiling junction in the first side and a second hole spaced from the first hole in the first side, the apparatus comprising:

a fluid transporting pipe positioned adjacent the wall/ceiling junction external to the first side of the wall; and a unitary, pre-assembled fitting shaped and configured to reside within the wall internal space with a first end extending into the first hole in the wall and a second end extending into the second hole in the wall, said second end being configured to receive a sprinkler head, said first end having a coupling configured to engage at least one end of said pipe for fluid communication from said pipe to said second end of said fitting.

2. The fire protection apparatus of claim 1, and further comprising a wall connector for fastening said fitting to a wall.

3. The fire protection apparatus of claim 2, wherein said wall connector is a bracket with bracket surfaces oriented in perpendicular fashion and configured so that the surfaces meet and fit to boa a ceiling surface and a wall surface.

4. The fire protection apparatus of claim 1, wherein said fitting comprises a main conduit connected between said first and second ends and said main conduit is defined by a J-shape.

5. The fire protection apparatus of claim 1, wherein said fitting comprises a main conduit connected between said first and second ends and said main conduit is of a diameter in the range of about 0.5 to about 1.0 inch.

6. The fire protection sprinkler apparatus of claim 1, wherein said fitting comprises a main conduit connected between said first and second ends and said main conduit is defined by an L-shape.

7. A method of installing a fire protection apparatus in a space having at least one wall and a ceiling in adjacent relationship therewith forming a wall/ceiling junction, the wall having a first side and a second side spaced from the first side and defining an internal space therebetween, the method comprising:

forming a top aperture in the first side of the wall;

forming a lower aperture in the first side of the wall, the lower aperture being spaced from the top aperture in the first side of the wall;

mounting a fluid transport pipe adjacent the wall/ceiling junction external to the first side of the wall;

mounting a unitary, angled fire protection fitting at the wall/ceiling junction, the fining comprising a main conduit having a distal end and a proximal end with a sprinkler head coupling on the distal end, said mounting being accomplished by inserting the distal end of the fitting though the top aperture and into the internal space so that the proximal end of the fitting remains external to the first side of the wall;

aligning the sprinkler head coupling with the lower aperture in the wall; and connecting the proximal end of the fining to at least one of the end of the pipe.

8. The method of claim 7, and further comprising securing molding to a wall surface to conceal said first end of said fitting.

9. A fire protection apparatus for installation in a space having at least one wall and a ceiling in adjacent relationship therewith forming a wall/ceiling junction on each side of the wall, the wall having a first side and second side spaced from the first side and defining an internal space therebetween, and having a first hole adjacent the wall/ceiling junction in the first side and a second hole adjacent the wall/ceiling junction in the second side generally aligned with the first hole, the apparatus comprising:

a first fluid transporting pipe positioned adjacent the wall/ceiling junction external to the first side of the wall; and a second fluid transporting pipe positioned adjacent the wall/ceiling junction external to the second side of the wall; and a unitary, preassembled fining shaped and configured to reside within the wall internal space with a first end extending into the first hole in the wall and second end extending into the second hole in the wall, said first end having a coupling configured to engage at least one end of said first pipe, said second end having a coupling configured to engage at least one end of said second pipe for fluid communication from said first pipe though said fitting to said second pipe.

10. A fire protection apparatus for installation in a space having at least one wall and a ceiling in adjacent relationship therewith forming a wall/ceiling junction on each side of the wall, the wall having a first side and second side spaced from the first side and defining an internal space therebetween, and having a first hole adjacent the wall/ceiling junction in the first side and a second hole spaced from the wall/ceiling junction in the second side, the apparatus comprising:

a fluid transporting pipe positioned adjacent the wall/ceiling junction external to the first side of the wall; and a unitary, preassembled fitting shaped and configured to reside within the wall internal space with a first end extending into the first hole in the wall and second end extending into the second hole in the wall, said first end having a coupling configured to engage at least one end of said first pipe, said second end being configured to receive a sprinkler head connection.

* * * * *